April 28, 1931. K. F. ADAMSON 1,802,366
VEHICLE
Filed April 3, 1928 3 Sheets-Sheet 1
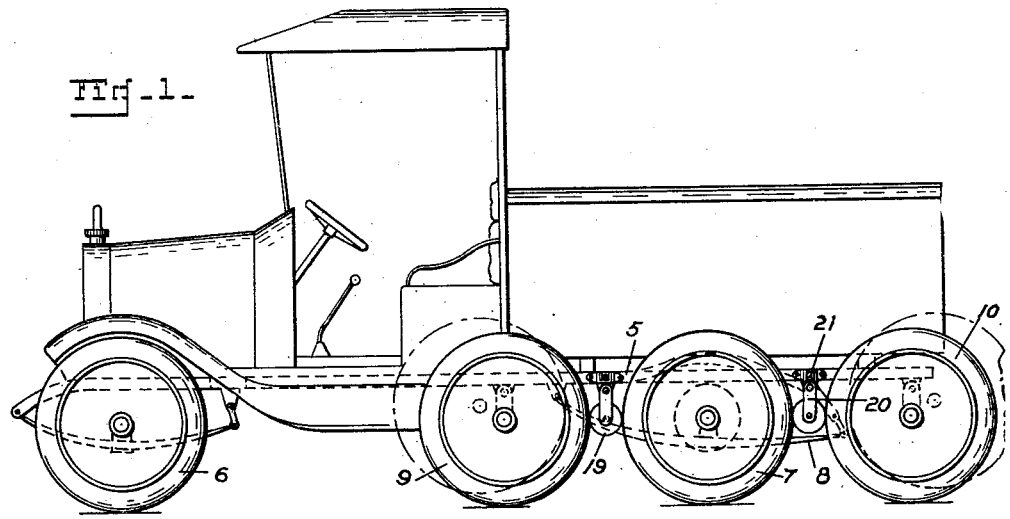
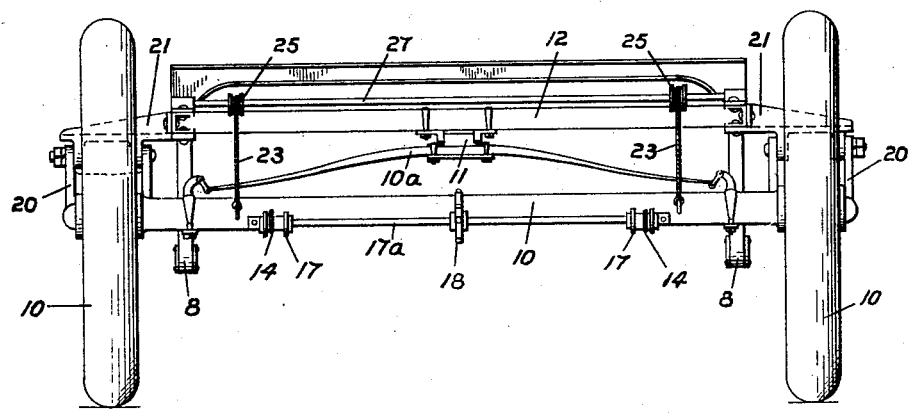
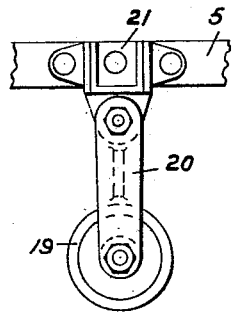 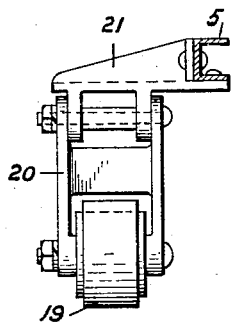
Inventor
Keith F. Adamson
W. N. Roach
Attorney April 28, 1931. K. F. ADAMSON 1,802,366
VEHICLE
Filed April 3, 1928 3 Sheets-Sheet 2
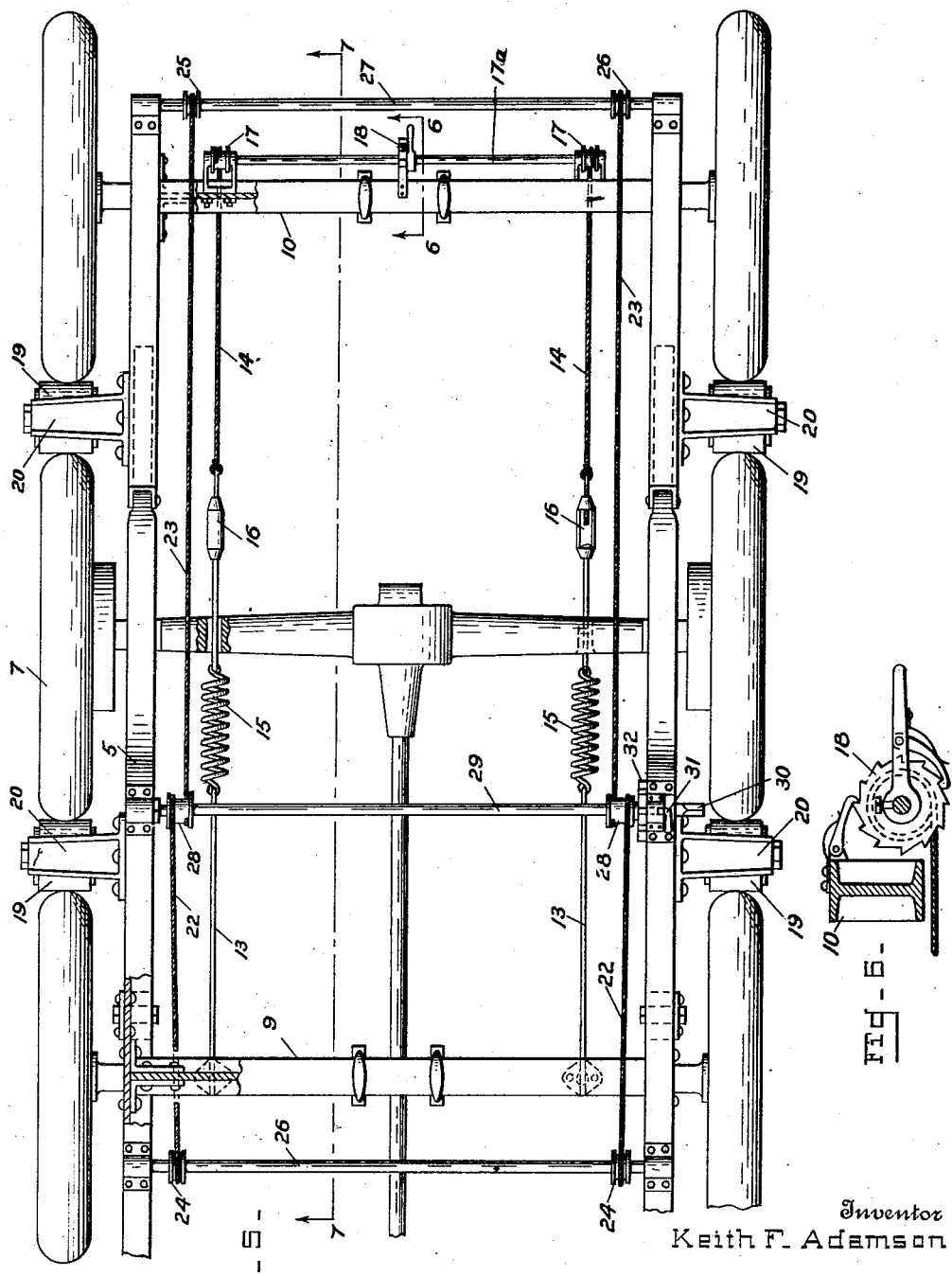
Inventor
Keith F. Adamson
By W. N. Roach
Attorney April 28, 1931. K. F. ADAMSON 1,802,366
VEHICLE
Filed April 3, 1928 3 Sheets-Sheet 3
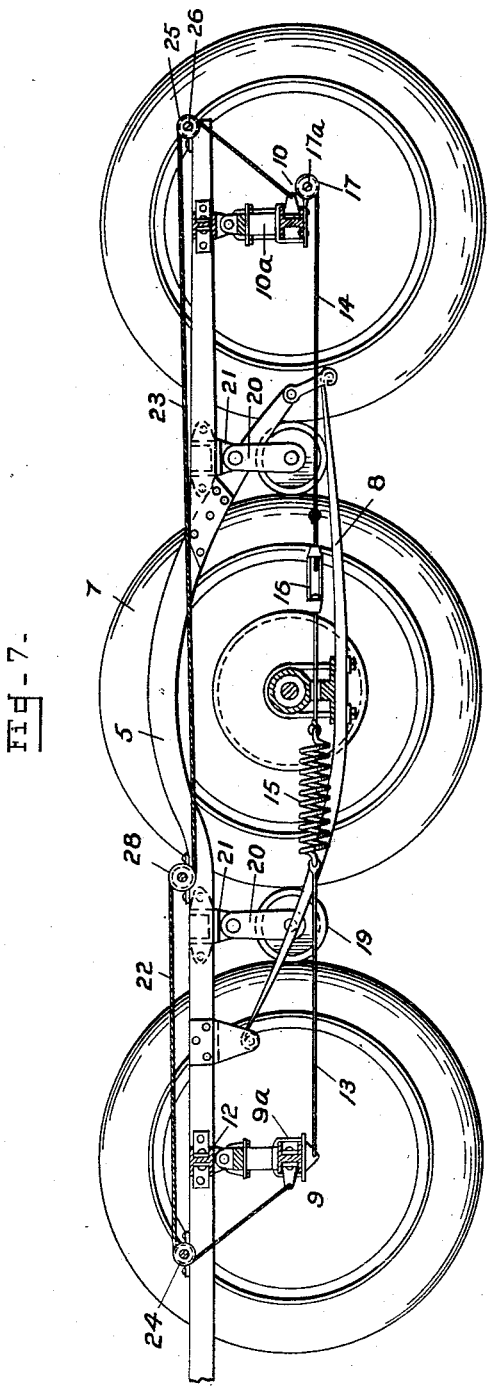
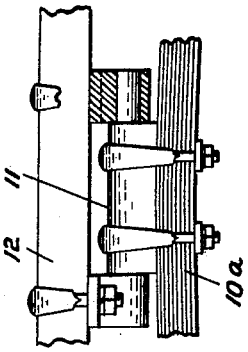
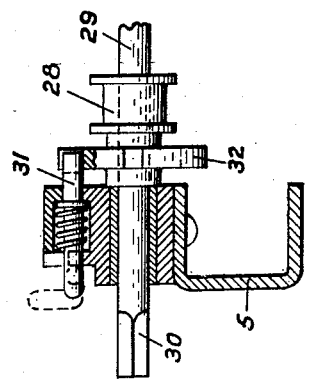
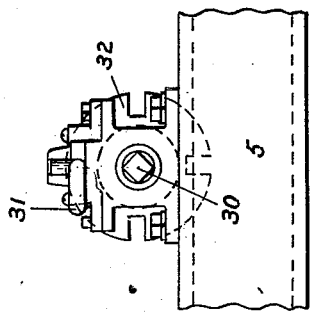
Inventor
Keith F. Adamson
By W. N. Roach
Attorney Patented Apr. 28, 1931

1,802,366

UNITED STATES PATENT OFFICE

KEITH F. ADAMSON, OF VIENNA, VIRGINIA

VEHICLE

Application filed April 3, 1928. Serial No. 266,998.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

The subject of this invention is a vehicle.

Vehicles which are designed for cross country traveling are usually provided with additional non-driving traction members for the purpose of reducing the unit ground pressure. Because of irregularities which are encountered the traction members or the supporting elements which run on the traction elements are generally mounted for vertical movement.

The principal object of the present invention is to provide a vehicle having auxiliary traction wheels which are driven in a novel manner by the primary driving wheels and which may be raised from the ground out of driving engagement. The invention is further characterized by a suspension which allows independent vertical yielding of the individual groups of wheels.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of the improved vehicle;

Fig. 2 is a view in rear elevation of the chassis;

Figs. 3 and 4 are views, respectively, in side and end elevation of the friction driving members;

Fig 5 is a plan view of the chassis;

Fig. 6 is a detail view on the line 6—6 of Fig. 5;

Fig. 7 is a detail sectional view on the line 7—7 of Fig. 5;

Figs. 8 and 9 are detail views of a portion of the inoperating mechanism;

Fig. 10 is a view in rear elevation showing a method of trunnioning the auxiliary axle units.

Referring to the drawings by numerals of reference:

The invention is illustrated as applied to a standard automobile having a chassis frame 5, front steering wheel 6, a primary rear axle unit having driving wheels 7 and a rear semi-elliptical spring suspension 8 parallel with the frame.

Mounted in front and in rear of the driving wheels 7 are auxiliary wheeled units, respectively, 9 and 10 each having a transverse spring 9a and 10a which are centrally trunnioned as at 11 to transverse beams 12 of the frame so as to be capable of swinging movement in the longitudinal plane of the vehicle.

The wheeled units 9 and 10 are normally moved towards each other by a connection consisting of a rod 13 and cable 14, the former attached to the forward unit and having an interposed spring 15 and turn buckle 16 and the latter connected to a pulley 17, fixed on a shaft 17a rotatably mounted on the axle of the rear unit. A pawl and ratchet mechanism 18 is carried by the shaft to effect its rotation. The connections are duplicated and hold the wheels of the two units in engagement with rollers 19 each of which is journaled in a depending hanger 20 pivotally connected to a bracket 21, secured to the chassis frame. By virtue of their pivotal suspension the rollers 19 are held in driving engagement with the rear driving wheels 7 and the additional traction members of the units 9 and 10 will, as a consequence, also serve as driving wheels.

When the vehicle is to travel over surfaces where the additional traction afforded by the units 9 and 10 is not required the units may be moved to an inoperative position as indicated in dotted lines in Fig. 1. The mechanism for effecting this change may conveniently consist of a double set of cables 22 and 23 which are attached to the axles of the units 9 and 10, then trained over pulleys 24 and 25 mounted on transverse braces 26—27, respectively positioned in front of the axle of the forward unit 9 and in rear of the axle of the rear unit 10. The other ends of both sets of cables 22 and 23 are secured to drums 28 fixed to a rotatable shaft 29 mounted on the frame 5 intermediate the braces 26—27. The shaft is formed with a squared end 30 for application of a crank.

For the purpose of releasably holding the shaft against rotation a latch mechanism 31 carried by the frame 5 is engageable with a toothed wheel 32 fast on the shaft. In moving the units 9 and 10 to inoperative position the tension of the spring 15 is reduced through manipulation of the pawl and ratchet mechanism 18.

The individual spring suspensions are each of sufficient capacity to take the entire rear load of the vehicle although suspensions of the additional traction units may be of reduced capacity so as to come into play after a predetermined load is placed on the primary suspension.

When the additional traction members are in operation they will conform to obstacles or depressions in the path of travel. The friction rollers 19 which are carried by the frame and therefore subject to the vertical displacements of the frame will tend to lose driving connection with the wheels when such displacement is excessive but by virtue of their pivotal suspension this is compensated for as the springs 15 are powerful enough to draw the units 9 and 10 towards each other even though these units be in contact with the ground. A similar action takes place in the event of vertical displacement of the units 9 and 10.

The positioning of the additional traction members in front of and in rear of the primary driving wheels will afford a balanced communication of power under practically all circumstances.

I claim:

1. In a vehicle, a chassis frame, a primary rear axle unit having driving wheels, a longitudinal spring suspension between the frame and primary axle unit, an auxiliary wheeled axle unit positioned in front of and in rear of the primary unit, a transverse spring suspension carried by the auxiliary units and trunnioned in the frame for movement in the longitudinal plane of the vehicle, means normally exerted to swing the auxiliary units towards each other, means for swinging them away from each other and a friction roller pivotally hung on the frame and positioned between each primary driving wheel and each auxiliary wheel.

2. In a vehicle, a chassis frame, a primary rear axle unit having driving wheels, a spring suspension between the frame and primary axle unit, an auxiliary wheeled axle unit positioned in front of and rear of the primary unit, a spring suspension carried by the auxiliary units and trunnioned in the frame for movement in the longitudinal plane of the vehicle, means normally exerted to swing the auxiliary units towards each other, means for swinging them away from each other and a friction roller pivotally hung on the frame and positioned between each primary driving wheel and each auxiliary wheel.

3. In a vehicle, a chassis frame, a primary rear axle unit having driving wheels, a spring suspension between the frame and primary axle unit, an auxiliary spring suspended wheeled axle unit positioned in front of and in rear of the primary unit and mounted on the chassis frame for swinging movement in the longitudinal plane of the vehicle, a friction roller pivotally hung on the chassis frame and positioned between each primary driving wheel and each auxiliary wheel, means for maintaining the auxiliary wheels in engagement with the rollers and means for inoperating the auxiliary units.

4. In a vehicle, a chassis frame, a primary rear axle unit having driving wheels, a spring suspension between the frame and primary axle unit, an auxiliary spring suspended wheeled axle unit positioned in front of and in rear of the primary unit and mounted on the chassis frame for swinging movement in the longitudinal plane of the vehicle, means for communicating a driving action from the traction element of the primary driving wheels to the auxiliary wheels and means for simultaneously maintaining the auxiliary wheels in or out of driving engagement.

5. In a vehicle, a chassis frame, a primary rear axle unit having driving wheels, a spring suspension between the frame and axle unit, an auxiliary spring suspended wheeled axle unit mounted in line with the primary unit for swinging movement in the longitudinal plane of the vehicle, drive-transmitting means engageable with the traction element of the primary wheels and the auxiliary wheels and means for simultaneously maintaining the auxiliary wheels in or out of driving engagement.

6. In a vehicle, a chassis frame, a primary rear axle unit having driving wheels, a spring suspension between the frame and axle unit, auxiliary spring suspended wheeled traction elements positioned in line with the primary driving wheels, means for communicating the driving action from the traction element of the primary driving wheels to the auxiliary traction elements and means for simultaneously maintaining the auxiliary traction elements in or out of driving engagement.

7. In a vehicle, a chassis frame, a primary rear axle unit having driving wheels, a spring suspension between the frame and axle unit, auxiliary wheeled traction elements positioned in line with the primary driving wheels, means for communicating the driving action from the traction element of the primary driving wheels to the auxiliary traction elements and means for simultaneously maintaining the auxiliary traction elements in or out of driving engagement.

KEITH F. ADAMSON.